United States Patent Office 2,936,298
Patented May 10, 1960

2,936,298
STABILIZED POLYMERS

Donald E. Hudgin, Summit, and Frank M. Berardinelli, South Orange, N.J., assignors to Celanese Corporation of America, New York, N.Y., a corporation of Delaware No Drawing. Application October 21, 1957
Serial No. 691,146

8 Claims. (Cl. 260—45.9)

This invention relates to polyoxymethylene polymers and particularly to polymer compositions of high thermal stability.

Polyoxymethylene polymers, having recurring

—CH$_2$O— units, have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

Polyoxymethylene of exceptionally high molecular weight and stability has been prepared by the repeated sublimation of trioxane from a temperature of 40° C. to a temperature of −80° C. Exceptionally high molecular weight polyoxymethylene has also been prepared by polymerizing anhydrous formaldehyde in the presence of aliphatic or primary aromatic amines or in the presence of arsines, stibenes or phosphines.

High molecular weight polyoxymethylenes have been prepared by polymerizing trioxane in the presence of certain fluoride catalysts such as antimony fluoride and may also be prepared in high yields and rapid reaction rates by the use of catalysts comprising certain boron fluoride coordinate complexes with organic compounds, as described in our application Serial No. 691,143, filed concurrently herewith, the entire disclosure of which is hereby incorporated by reference. Boron fluoride gas is also a rapid and effective catalyst, as disclosed in our application Serial No. 691,144, filed concurrently herewith.

Although polyoxymethylenes prepared by some methods are much more stable against thermal degradation than those prepared by other methods, it is nevertheless desirable for many uses that the thermal stability be increased. It has been proposed to stabilize polyoxymethylene polymers with hydrazines, secondary or tertiary monomeric aromatic amines, phenols or ureas.

We have now found that polyoxymethylene polymers may be stabilized with a novel class of stabilizers which are more effective than those previously used when used in equal concentrations or equally effective when used in smaller concentrations.

In accordance with this invention thermally stable compositions are prepared comprising polyoxymethylene intimately associated with a N,N,N',N'-tetra(hydroxyalkyl) alkylene diamine.

Although these stabilizers improve the thermal stability of even relatively low molecular weight polyoxymethylenes, it is preferred to combine them with polyoxymethylenes which are of relatively high molecular weight and which are relatively stable in the raw state against thermal degradation. It is preferred to use polymers having an inherent viscosity of at least 1.0 measured at 60 C. as a 0.5% solution in p-chlorophenol containing 2% alpha-pinene. It is also preferred to utilize polymers which, in raw state, lose less than 50% in weight in ¾ hour when maintained at a temperature of 222° C. in a vessel under nitrogen but open to the atmosphere through a capillary tube. It is to be understood that the term "polyoxymethylene" as used herein, includes polymers substantially composed of recurring —CH$_2$O— groups, but not necessarily exclusively. The term does not preclude end groups of different character, even when modified after polymerization.

The hydroxyalkyl groups of the N,N,N',N'-tetra(hydroxyalkyl) alkylene diamines preferably have from 1 to 5 carbon atoms and only one hydroxy group. The hydroxyalkyl groups need not be identical although they generally are. The alkylene groups preferably have from 1 to 6 carbon atoms. Among the specific compounds which may be used in accordance with this invention are N,N,N',N'-tetrakis(2-hydroxypropyl)-1,2-ethylene diamine, and N,N,N',N'-tetrakis(2-hydroxyethyl)-1,2-ethylene diamine.

The stabilizer compounds are generally not used in amounts exceeding 15%, based on the weight of the polymer. Preferably, amounts between about 0.5 and about 10 weight percent are used.

The stabilizer compounds are generally admixed intimately by being applied in solution to the finely divided solid polymer followed by evaporation of the solvent. Diethyl ether is an excellent solvent for this purpose. The admixture may also be made by milling the dry solids together or by dissolving both the polymer and the stabilizer in a common solvent and evaporating the solvent.

The compositions of this invention may also include, if desired, plasticizers, fillers, pigments, anti-oxidants and other stabilizers, such as stabilizers against degradation caused by ultra violet light.

Example

Polyoxymethylene, prepared by polymerizing molten trioxane at a temperature of 90–100° C. in the presence of 0.033% by weight of boron fluoride etherate, was ground and screened to pass through a U.S. #40 screen. To a portion of the polymer, sufficient diphenylamine in 5% solution by weight in diethyl ether, was applied to yield upon drying a composition containing 1% by weight of diphenylamine. To another portion of the polymer, sufficient N,N,N',N'-tetrakis(2-hydroxypropyl)-2,2-ethylene diamine, in 5% solution by weight in diethyl ether, was applied to yield upon drying a composition containing 1% by weight of N,N,N',N'-tetrakis(2-hydroxypropyl)-1,2-ethylene diamine. Two gram samples of both portions were compression molded at 200° C. for 3 minutes to produce discs of 20 mil thickness. The disc containing diphenylamine broke when it was bent through 180° along a line while the disc containing N,N,N',N'-tetrakis(2-hydroxypropyl)-1,2-ethylene diamine could be bent through 180° and back through 360° without breaking.

It is to be understood that the foregoing detailed description is given merely by way of illustration and that many variations may be made therein without departing from the spirit of our invention.

Having described our invention what we desire to secure by Letters Patent is:

1. A composition comprising a high molecular weight polyoxymethylene having recurring oxymethylene groups linked directly to each other intimately associated with a N,N,N',N'-tetra(mono-hydroxyalkyl) alkylene diamine having hydroxyalkyl groups containing from 1 to 5 carbon atoms and alkylene groups containing from 1 to 6 carbon atoms, the diamine being present in amount sufficient to stabilize the polyoxymethylene against thermal degradation.

2. A composition comprising a high molecular weight polyoxymethylene having recurring oxymethylene groups linked directly to each other intimately associated with from about 0.5 to about 10 weight percent of a N,N,N',N'-tetra(mono-hydroxyalkyl) alkylene diamine having hydroxyalkyl groups containing from 1 to 5 carbon atoms and alkylene groups containing from 1 to 6 carbon atoms.

3. A composition comprising a high molecular weight polyoxymethylene having recurring oxymethylene groups linked directly to each other intimately associated with N,N,N',N'-tetrakis(2-hydroxypropyl)-1,2 ethylene diamine, the diamine being present in amount sufficient to stabilize the polyoxymethylene against thermal degradation.

4. The composition of claim 3 wherein said polyoxymethylene is obtained by the polymerization of trioxane in the presence of boron fluoride etherate.

5. A composition comprising a high molecular weight polyoxymethylene having recurring oxymethylene groups linked directly to each other intimately associated with from about 0.5 to about 10 weight percent of N,N,N',N'-tetrakis(2-hydroxypropyl)-1,2 ethylene diamine.

6. A method of stabilizing polyoxymethylene having recurring oxymethylene groups linked directly to each other which comprises intimately admixing therewith a N,N,N',N'-tetra(mono-hydroxyalkyl) alkylene diamine having hydroxyalkyl groups containing from 1 to 5 carbon atoms and alkylene groups containing from 1 to 6 carbon atoms, the diamine being present in amount sufficient to stabilize the polyoxymethylene against thermal degradation.

7. A method of stabilizing high molecular weight polyoxymethylene having recurring oxymethylene groups linked directly to each other which comprises intimately admixing therewith from about 0.5 to about 10 weight percent of N,N,N',N' - tetrakis(2 - hydroxypropyl) - 1,2 ethylene diamine.

8. The composition of claim 5 wherein said high molecular weight polyoxymethylene has an inherent viscosity of at least 1.0 measured at 60° C. as a 0.5% solution in p-chlorophenol containing 2% alpha-pinene and wherein said polyoxymethylene, in raw state, loses less than 50% in weight in ¾ hour when maintained at a temperature of 222° C. in a vessel under nitrogen but open to the atmosphere through a capillary tube.

References Cited in the file of this patent
FOREIGN PATENTS
748,856    Great Britain _____ May 9, 1956

OTHER REFERENCES
"Quadrol," Technical Data Sheet, Wyandotte Chem. Corp. (May 9, 1956), page 1.